US006536042B1

(12) United States Patent
Paul

(10) Patent No.: US 6,536,042 B1
(45) Date of Patent: Mar. 18, 2003

(54) SIGNAL DISTRIBUTION SYSTEM WITH INTEGRATED IR SIGNAL CONTROL

(75) Inventor: Lawrence Marc Paul, Randolph, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/317,469

(22) Filed: May 24, 1999

Related U.S. Application Data

(63) Continuation-in-part of application No. 09/082,652, filed on May 21, 1998.

(51) Int. Cl.[7] ................................................ H04N 7/20
(52) U.S. Cl. .......................... 725/69; 725/70; 725/71; 725/78; 725/80; 725/133; 455/3.06
(58) Field of Search ............................ 725/68–71, 63, 725/78, 80, 133, 121, 126; 455/3.02, 3.03, 3.06

(56) References Cited

U.S. PATENT DOCUMENTS 4,885,803 A * 12/1989 Hermann et al. ............ 455/603
5,193,208 A * 3/1993 Yokota et al. ................ 455/4.1
6,177,962 B1 * 1/2001 Foye et al. .................. 348/706

* cited by examiner

Primary Examiner—Andrew Faile
Assistant Examiner—Ngoc Vu
(74) Attorney, Agent, or Firm—Thomas, Kayden, Horstemeyer & Risley, LLP

(57) ABSTRACT

A plurality of outlets has at least a first outlet coupled to an IR target for providing a first local comparatively low-frequency electrical IR signal in response to an IR signal received by the IR target. At least a second outlet is coupled to an IR emitter. A distribution module is coupled to each outlet by respective first and second cables, wherein each of the first and second cables is sufficient to carry both comparatively high-frequency signals and comparatively low-frequency electrical IR signals between a respective outlet and the distribution module. The distribution module combines all local electrical IR signals received from said outlets via said respective first cables into a combined electrical IR signal and transmits the combined electrical IR signal to the IR emitter via said second cable.

15 Claims, 4 Drawing Sheets

SIGNAL DISTRIBUTION SYSTEM WITH INTEGRATED IR SIGNAL CONTROL

CROSS-REFERENCES TO RELATED APPLICATIONS

This application is a continuation-in-part of U.S. patent application Ser. No. 09/082,652, filed May 21, 1998, the entirety of which is incorporated herein by reference.

BACKGROUND OF THE INVENTION

1. Field of the Invention

The present invention relates to a signal distribution system for distributing and interconnecting cable television (CATV), satellite, telephone data, and infra-red (IR) control signals among a plurality of outlets at a site.

2. Description of the Related Art

It is often desirable to transmit various types of signals to or between different components or appliances in a given site or location. For example, in a residential site (e.g., a "house"), it may be desirable to distribute telephone data signals, digital broadcast satellite (DBS) signals, IR control signals, and CATV signals to different locations and components throughout the house. Each such location and component is typically associated with a given outlet having input and output terminals coupled to transmission media such as cables.

In some current usages, various signals are passed through control equipment and routed to fixed destinations (outlets) in the house. One problem that arises in such situations is that installation personnel and the homeowner are required to plan where they want to place a satellite receiver in advance of installation. Such estimation is often difficult, and such an approach also makes it costly to change the location of a satellite receiver. In addition, this approach typically leads to a limited number of DBS lines, for example two, which may be insufficient if the homeowner desires to use more than two satellite receivers. Further, in such approaches there is a lack of integration in the distribution of telephone data, CATV, and DBS signals. This leads to a lack of symmetry, flexibility, and accompanying drawbacks.

IR signals are also employed for data transmission or control purposes at such sites. IR remote control devices are typically used that emit a coded IR signal to control a device having a corresponding IR target. It is desirable to allow such an IR controller in one location of the house to be used to control a device located in another location in the house. Various techniques have been used to accomplish this. For example, IR repeaters may be set up to guide the controlling IR signal from one room to another. Alternatively, the IR signal may be converted to a wireless (radio frequency, or RF) signal, and received at location to be controlled, and converted back to IR via an LED (light-emitting diode) so that it can be received by the IR target of the device to be controlled. Other solutions involve using an extra telephone pair to send the electric version of the IR signal through the house. However, such solutions require an independent, separate network ("overlay" network) which is not integrated with an integrated signal distribution network.

A coaxial (coax) line used by the device to be controlled may also be used to transmit such a signal to another location in the house. Unfortunately, transmission of such signals over a coaxial line shared by other devices such as TV tuners, DBS equipment, and the like, can damage this equipment. This is because the electrical signal used to drive an IR emitter (e.g., an LED and related circuitry) and transmitted via a coaxial line is a relatively low-frequency (e.g., a few kHz) series of DC pulses of either 0 to 5 V or 0 to 12 V amplitude. TVs and other devices, however, receive RF signals typically in a range of 54–750 MHz, via coaxial cables. (Other signals, such as DBS signals, may be transmitted at even higher frequencies, e.g. in the range of 950–1600 MHz.) A series of comparatively low frequency AC square waves having an amplitude in the range of 5–12 V (the electrical IR signal) appears as a DC signal to equipment designed to receive and transmit RF or higher-frequency signals. Thus, the electrical signal used to drive an IR LED may be referred to herein as a DC IR signal, because it appears as a DC signal to such equipment. Sending a "DC" signal of this sort of 5 to 12 V over the coaxial line can damage TV tuners, DBS equipment, and other comparatively high-frequency-compatible devices coupled directly or indirectly to the coaxial line.

This potential damage can be avoided by providing a special coaxial outlet. However, such a solution would most likely be more expensive than the standard outlet. Further, since it would probably not be obvious in advance where to place these special outlets, they would have to be added after initial construction to those specific locations where they are needed which is a less than ideal situation.

SUMMARY

A system, apparatus, and method for distributing signals. A plurality of outlets has at least a first outlet coupled to an IR target for providing a first local comparatively low-frequency electrical IR signal in response to an IR signal received by the IR target. At least a second outlet is coupled to an IR emitter. A distribution module is coupled to each outlet by respective first and second cables, wherein each of the first and second cables is sufficient to carry both comparatively high-frequency signals and comparatively low-frequency electrical IR signals between a respective outlet and the distribution module. The distribution module combines all local electrical IR signals received from said outlets via said respective first cables into a combined electrical IR signal and transmits the combined electrical IR signal to the IR emitter via said second cable.

DESCRIPTION OF THE PREFERRED EMBODIMENT

In the present invention, there is provided a signal distribution system which integrates and distributes telephone data, CATV, IR, and DBS signals, and provides these signals to a plurality of similar outlets throughout a given site, such as a home. In addition, the present invention provides for flexibility in receiving audio/video (A/V) data from a selected site to be distributed to the plurality of outlets. The present invention also provides for flexibility in receiving local IR signals and distributing these IR signals to the plurality of outlets without damaging TVs, VCRs, and other RF or high-frequency signal receiving equipment coupled to the signal distribution network. The present invention also allows for a local area network (LAN) to be conveniently implemented.

Figure 1:
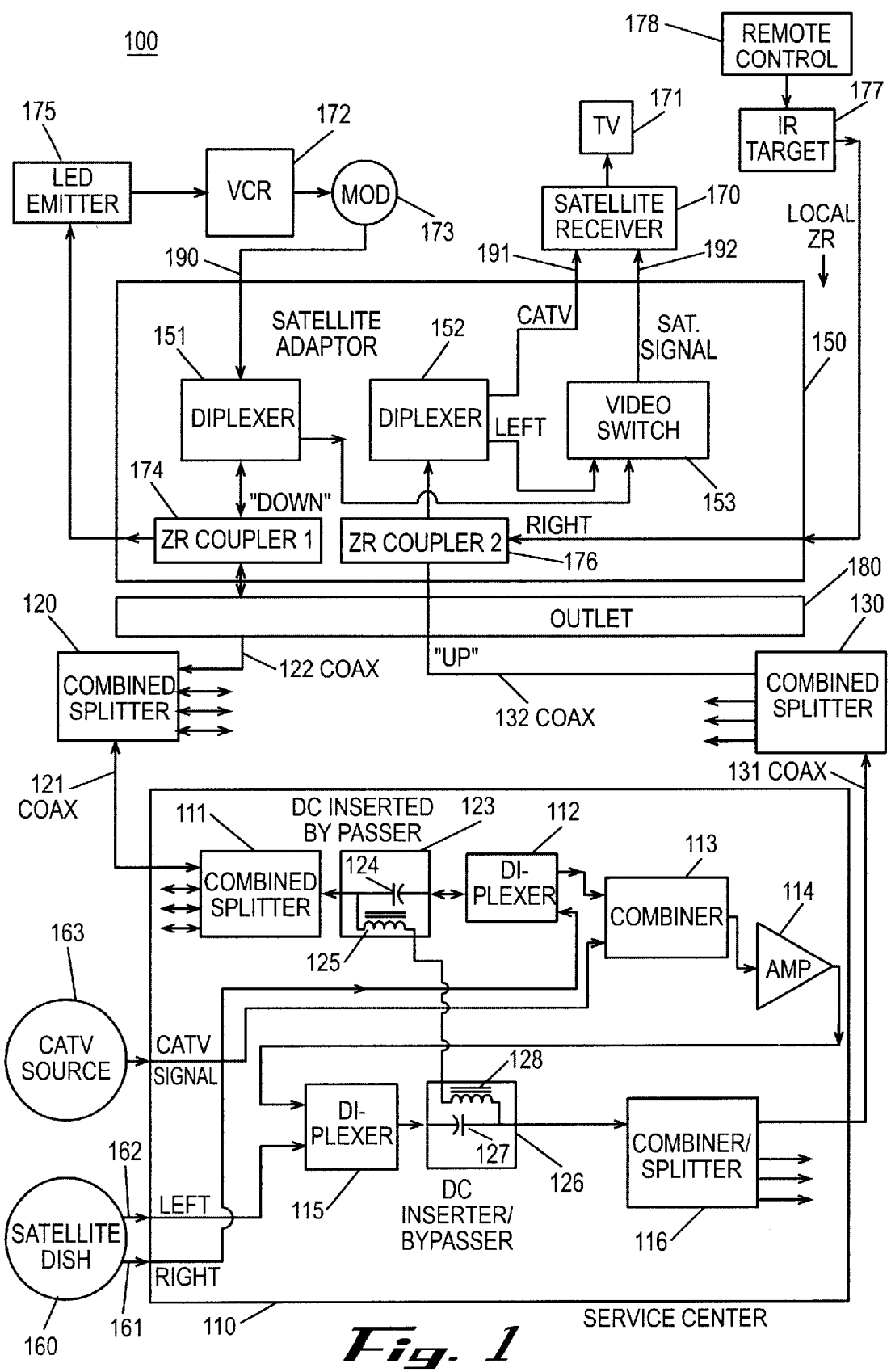
FIG. 1 is a block diagram of a signal distribution system, in accordance with an embodiment of the present invention.

Referring now to FIG. 1, there is shown is a block diagram of a signal distribution system 100, in accordance with an embodiment of the present invention. System 100 includes CATV source 163, satellite dish 160, distribution module or service center 110, combiner/splitter 120, combiner/splitter 130, outlet 180, satellite adaptor 150, VCR 172, modulator 173, type 1 IR coupler 174, LED emitter 175, TV 171, type 2 IR coupler 176, IR target 177, IR remote control device 178, and satellite receiver 170. In alternative embodiments, combiner/splitter 120 and combiner/splitter 130 may be considered as part of service center module 110.

As illustrated, CATV source 163 (which may be a cable delivered to the home by a local CATV company) delivers a "master" CATV signal to service center 110. The master CATV signal may contain several dozen or more CATV channels. Satellite dish 160 is a dual low noise block-converter (LNB) dish, which provides both left-handed and right-handed polarized signals on lines 162 and 161, respectively, to service center 110. These two polarized signals may be referred to collectively as the DBS signal.

It is desirable that the DBS signal be provided at a variety of locations (outlets) throughout the site, so that any number of satellite receivers may be placed at a variety of locations, as desired. It is also desirable to provide at these locations the CATV signal, as well as a telephone data connection, so that a unified and symmetrical connectivity scheme is implemented. It is also desirable to use the same network that transmits CATV signals to also transmit IR signals from one outlet to another. Therefore, in the present invention, a plurality of identical wall outlets 180 is provided throughout the house, each serviced by service center 110. Each outlet 180 (described in further detail with respect to FIGS. 2 and 3) contains uniform terminals that provide access to telephone data, CATV, IR, and DBS signals. In embodiments in which DBS signals are transmitted through the network, at least some of the outlets are coupled to a satellite adaptor 150. (For alternative systems distributing only CATV and IR signals, the satellite adaptors 150 are not employed.)

Figure 4:
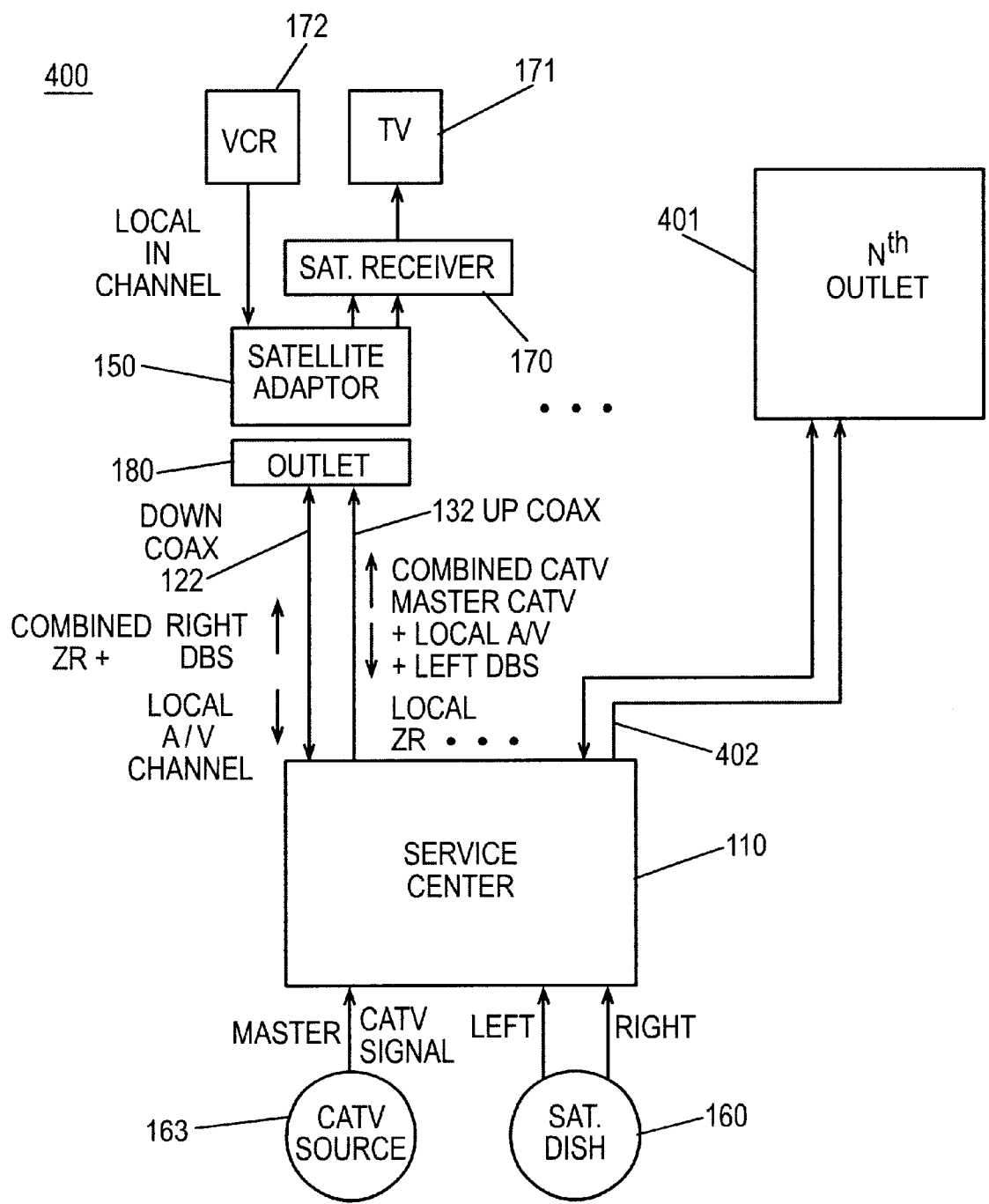
FIG. 4 is an overall system diagram illustrating the signal distribution system of FIG. 1.

Referring now to FIG. 4, there is shown an overall system diagram 400 illustrating the signal distribution system 100 of FIG. 1. As shown, service center 110 is coupled by N (e.g., N=16) pairs of coaxial cables to N locations, each having its own outlet and associated components. These are the only transmission media needed, in the present invention, to distribute CATV, DBS, and IR signals among outlets of system 100, using a centralized distribution module or service center 110. Service center 110 receives local IR and A/V signals via the coax cable pairs, and also receives the master CATV and DBS signals, and combines and routes the signals to provide combined IR, combined CATV, and DBS signals to each outlet. Service center 110 also isolates high-frequency compatible components from the comparatively low-frequency IR signals. Satellite adaptors 150 are employed at outlets to allow the DBS signals to be transmitted, and each satellite adaptor 150 also isolates high-frequency compatible components therein and coupled thereto from the comparatively low-frequency IR signals.

Service center 110 receives as inputs a master CATV signal, and left-handed and right-handed polarized DBS signals, from CATV source 163 and satellite dish 160, respectively. Each pair of coaxial cables comprises a "down" coax cable 122 and an "up" coax cable 132. Down cable 122 is bidirectional, and carries the local A/V channel (a TV type signal) from a particular outlet (180) to service center 110. It also carries the right-handed polarized DBS signal and the combined IR signal from service center 110 to outlet 180. The combined IR signal contains the combination (superimposition) of all local IR signals received by service center 110.

Up cable 132 is also bidirectional, and carries both the combined CATV signal (i.e., the master CATV signal plus any local A/V (TV) signals) and the left-handed polarized DBS signal up to outlet 180. Up cable 132 also carries the local IR signal down to service center 110 from a particular outlet (outlet 180). Similar signals are carried on cable pairs 402 to each of the other (N-1) outlets 401, except that the local A/V channel transmitted down to service center 110 on the down coax cable may be different from the local A/V channel transmitted by VCR 172 of outlet 180 (or nonexistent); and the local IR signals transmitted down from given outlets may be different from than those from other outlets (or nonexistent). Each satellite adaptor 150, therefore, provides both the combined CATV and the DBS signals to a satellite receiver 170 and a combined IR signal to an LED emitter for that outlet; and also transmits the local A/V channel and local IR control signals back down to service center 110, for distribution to all other outlets also coupled to service center 110.

Thus, the three types of signals (CATV, DBS, and IR) are distributed among the multiple outlets using only a single pair of coaxial cables per outlet, by allocating the signal types to the cables as described above, and by using service center 110 to perform combining, splitting, and isolating functions in this regard, as described in further detail below. The bandwidth of the two coaxial cables utilized for each outlet is efficiently utilized, since each cable carries a left- or right-handed polarized DBS signal up to it respective outlet, and also carries a CATV signal, either up to the outlet or back down from the outlet, and also carries an IR signal, either up to the outlet or back down from the outlet.

Referring once more to FIG. 1, service center 110 is coupled via combiners/splitters 111, 120, 116, and 130 to N identical outlets such as outlet 180, each having an adaptor such as adaptor 150. Each outlet 180 also includes telephone data lines (illustrated with respect to FIGS. 2 and 3, below). N may be, for example, 16, or a different number such as 4.

Service center 110 comprises diplexers 112 and 115, DC inserter/bypasser 123, DC inserter/bypasser 126, combiner/splitter 111, combiner 113, amplifier 114, and combiner/splitter 116. Each satellite adaptor 150 comprises diplexers 151 and 152 and video switch 153. Each diplexer is a passive "Y" connector which either combines signals in different frequency ranges or splits a signal, while providing for appropriate impedance matching and filtering, as will be understood. A splitter such as combiner/splitter 116 receives an input signal (the output of DC inserter/bypasser 126) and splits this to provide four identical outputs. Each of these four outputs is fed as an input to four further combiner/splitters, such as combiner/splitter 130, each of which provides four more signals, for a total of sixteen signals.

A combiner/splitter such as combiner/splitter 111 also splits an input signal received at the unified "input" terminal and provides the same input signal on four different outputs, and also combines signals received on the four "output" terminals into a single signal at the "input" terminal. For example, the signal received by combiner/splitter 111 from DC inserter/bypasser 123 is split and distributed out as four identical signals, to four further combiner/splitters (e.g., combiner/splitter 120). Also, combiner/splitter 120 can receive signals at one of the four "output" lines from Type 1 IR coupler 174 of a given satellite adaptor 150, and combine this with any other signals received from other satellite adaptors. Video switch 153 is a two-input, one-output RF switch (such as a Channel Master 6101FD, manufactured by the Channel Master division of Avent, Inc., 1315 Industrial Park Drive, PO Box 1416, Smithfield, N.C. 27577; http://www.channelmasterinc.coml/), through which an LNB block converter IF signal for a satellite receiver, from either the left-handed or right-handed polarized signal, is passed, in accordance with a selecting voltage signal received from the satellite receiver. DC inserter/bypasser 123 includes an LC filter comprising capacitor 124 and choke coil 125. DC inserter/bypasser 126 includes an LC filter comprising capacitor 127 and choke coil 128.

The left-handed and right-handed polarized DBS signals received via lines 162 and 161, respectively, are typically in the 950–1600 MHz range, and the CATV signal received from CATV source 163 are typically in the 54–750 MHz range. Therefore, both a CATV signal and a right-handed or left-handed polarized signal can be combined on the same coaxial cable. Electrical IR signals are relatively low-frequency (e.g., a few kHz) series of DC pulses of either 0 to 5 V or 0 to 12 V amplitude, thus appearing as DC to CATV- and DBS-compatible equipment. Electrical IR signals may also be combined with CATV and a DBS signal on the same coaxial line, although isolation is necessary to protect the high-frequency equipment from the DC IR signal.

Lines 121, 122, 131, and 132 are preferably coaxial cables, compliant with the CEBus standard, of a quality sufficient to carry combined DBS, CATV, and IR signals. The CEBus standard provides a home Plug & Play™ interoperability specification for in-home networks. This specification lists "product-to-product" interoperability specifications for those products using home LANs. Product producers adhering to this specification are told how their products should behave, if they want their products to interoperate with products produced by unrelated manufacturers. The specification details a set of behavioral characteristics for products and systems within the home that will allow them to take actions based upon the state of the home. Further information regarding the CEBus standard may be found at http:/lwww.cebus.org.

Combiner 113 receives both the master CATV signal from CATV source 163, as well as the output of diplexer 112. The signal provided by diplexer 112 to combiner 113 is one or more "local" AV (TV) signals sent down from one or more wall outlets, e.g. a local A/V signal sent down from VCR 172 of outlet 180 via down line 122. VCR 172 and modulator 173 may provide a local channel of A/V data on, for example, unused channel 27, which is then fed by diplexer 151 and Type 1 IR coupler 174 via down line 122 to combiner/splitter 120, which then feeds the signal to combiner 111. Any of the N outlets may transmit local A/V signals down to service center in this manner, via combiner/splitter 120, 111, and the corresponding down coax for that outlet. The output of combiner 113, including master CATV signals from CATV source 163 plus local CATV data from wall outlets is a "combined" or composite CATV signal that is applied to amp 114, without the "DC" IR signal being applied to diplexer 112, combiner 113, amp 114, or diplexer 115, due to the DC isolating effect of DC inserter/bypasser 123 and DC inserter/bypasser 126, as described in further detail below.

Amp 114 therefore provides a combined CATV signal to diplexer 115, which contains the master CATV information from CATV source 163 plus the channel of data from VCR 172, in addition to any other local A/V data from other wall outlets. This CATV signal is then combined by diplexer 115 with the left-handed polarized DBS signal, and provided to combiner/splitter 116 (via DC inserter/bypasser 126). This combined signal (combined CATV signal plus left-handed polarized DBS signal) is provided to sixteen identical outlets by combiner/splitter 116 and four further combiner/splitters such as combiner/splitter 130. In particular, this information is provided via up coax line 132 to satellite adaptor 150 through its corresponding wall outlet 180.

Combiners/splitters 120, 111, 116, and 130 are also used to distribute IR signals. Thus, up to N (16) local IR signals may be received by combiner/splitter 130 and four further splitter/combiners, to provide all local IR signals to service center 110; and a combined IR signal combining all these local IR signals is transmitted to each of the 16 outlets via combiner/splitter 111 and four further combiner/splitters such as combiner/splitter 120. However, diplexer 112, combiner 113, amp 114, and diplexer 115 do not receive any of the DC IR signals due to the presence of DC inserter/bypasser 123 and DC inserter/bypasser 126, thereby protecting high-frequency equipment such as amplifier 114 and diplexers 112 and 115.

The combined IR signal provided by combiner/splitter 116 is routed around the sensitive high-frequency components and to combiner/splitter 111 for distribution to the outlets by DC inserter/bypasser 126 and DC inserter/bypasser 123. DC inserter/bypasser 126's LC filter prevents the combined DC IR signal from being applied to diplexer 115 and other components to which it is coupled (diplexer 112, combiner 113, amp 114, CATV source 163, and satellite dish 160), and instead passes the DC signal around these components to DC inserter/bypasser 123. The LC filter of DC inserter/bypasser 123 also prevents the combined IR signal from reaching diplexer 112 and therefore combiner 113, amp 114, and diplexer 115. DC inserter/bypasser 123 then applies the combined IR signal to combiner/splitter 111, which, via 4 other combiner/splitters such as combiner/splitter 120, passes the combined IR signal up to each outlet such as outlet 180.

Diplexer 112 receives the right-handed polarized DBS signal and feeds this to combiner/splitter 111, again via DC inserter/bypasser 123. These high-frequency signals pass without hindrance through the capacitor 124 of DC inserter/bypasser 123, unlike the low-frequency "effectively DC" IR signals, which are blocked by capacitor 124. Combiner/splitter 111 then provides this right-handed polarized DBS signal to four combiner/splitters, including combiner/splitter 120, each of which is itself coupled to four outlets, including outlet 180 for satellite adaptor 150. Thus, the right-handed polarized DBS signal is provided to diplexer 151 of satellite adaptor 150 via down line 122. Conversely, down line 122 also carries the CATV signal from VCR 172 back "down" to service center 110. Thus, although down line 122 carries CATV signals down to service center 110, line 122 is bi-directional since it also carries the right-handed polarized DBS signal and combined IR signal from service center 110 up to satellite adaptor 150.

Diplexer 151 feeds the right-handed polarized DBS signal from line 122 to video switch 153, and also applies the CATV signal from VCR 172 onto line 122. Type 1 IR coupler 174 intercepts the combined IR signal from combiner/splitter 120 and drives LED emitter 175 with the combined IR signal, and thereby isolates VCR 172, modulator 173, and other high-frequency components coupled to diplexer 151 from the combined IR signal. Diplexer 152 splits the combined left-handed polarized DBS signal and CATV signal received from line 132, and applies the CATV portion to line 191, and the left-handed polarized DBS signal portion as an input to video switch 153. Video switch 153 then applies a standard satellite receiver compatible signal to line 192. Satellite receiver 170 thus receives both the standard CATV signal from line 191 (which contains both CATV signals from CATV source 163 plus the CATV signal produced by VCR 172) and the standard DBS signal on line 192. In response to user control of satellite receiver 170, satellite receiver delivers a desired TV channel to TV 171, i.e., a TV channels from the CATV signal or from the left-handed or right-handed polarized DBS signals. Thus, bandwidth of lines 122 and 132 is efficiently utilized, since each line 122, 132 carries a left- or right-handed polarized DBS signal up to outlet 180, and also carries a CATV signal, either up to outlet 180 or back down from outlet 180, and also carries an IR signal either up to or down from the outlet.

Accordingly, each coax line may carry, in addition to CATV and DBS signals, either a local IR signal down to service center 110 ("up" line 132) or a combined IR signal up to each outlet (e.g., "down" line 122). At any location having an outlet, preferably at a location having a display or playback means such as TV 171 that plays an A/V signal received from an A/V source at another location, such as a second VCR at another outlet, where the A/V source (second VCR) is controllable by an IR remote control device, an IR target 177 is placed so that it can receive IR signals from remote control device 178. IR target 177 converts the received local IR signal into an IR electrical signal and provides this electrical IR signal to IR coupler 176. This coupler isolates diplexer 152, and therefore satellite receiver 170, TV 171, and other high-frequency components coupled to diplexer 152, from the local IR signal generated by IR target 177. IR coupler 176 provides the local IR signal down to DC inserter/bypasser 126 of service center 110, via coax line 132.

This local IR signal is then combined with the combined IR signal transmitted to all outlets, as described previously. The second VCR thus receives the local IR signal intended therefor as part of the combined IR signal. Either, both, or neither of IR couplers 174, 176 may be provided as part of adaptor 150, when an adaptor is utilized for a given outlet.

In alternative embodiments, different A/V sources may be coupled to line 190 instead of VCR 172. For instance, in one room a video camera monitoring a baby in a crib can be coupled to line 190 of the room's outlet. This video camera (not shown) may provide an A/V channel of CATV information on, for example, channel 68. Assuming channel 68 is unused (i.e., CATV source 163 does not provide information on channel 68), then any TV coupled to line 191 of any outlet (or any TV coupled to a satellite receiver coupled to terminals 191 and 192) may switch to channel 68 to display the video camera's output. For example, this may be used as a picture-in-picture (PIP) display while viewing another program on the TV, such as a DBS movie channel.

Additionally, a data source such as VCR 172 can transmit information "down" to service center 110 on more than one channel assuming none of these channels is used by CATV source 163 or by any other source coupled to line 190 of another outlet.

Figure 2:
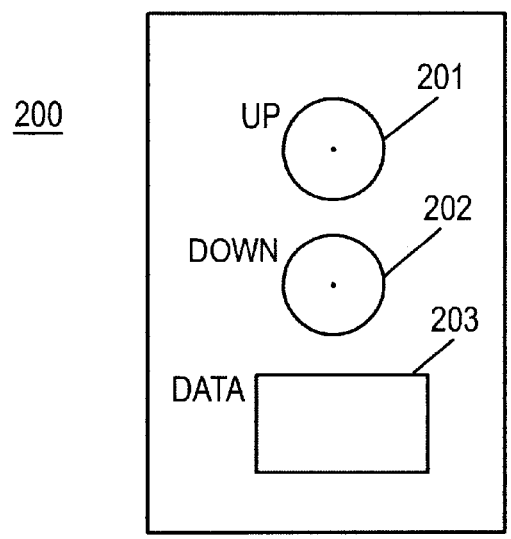
FIG. 2 is a block diagram of a front view of a wall outlet of the signal distribution system of FIG. 1.
Figure 3:
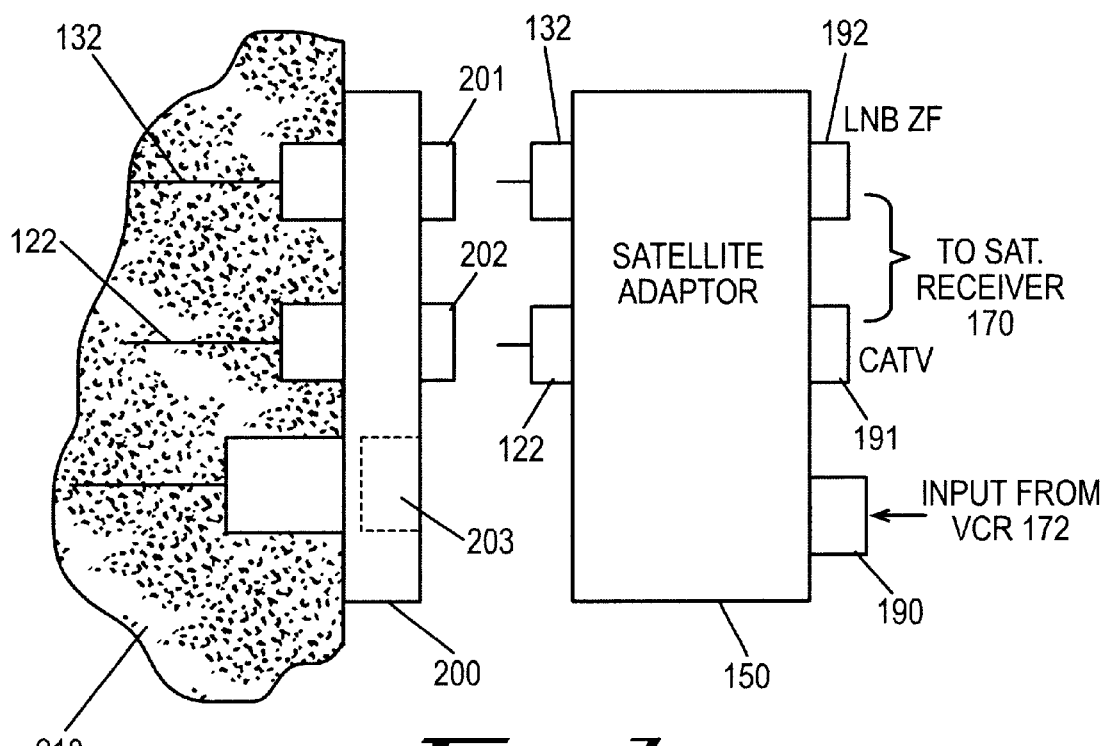
FIG. 3 depicts a side perspective view of the wall outlet of FIG. 2 and a satellite adaptor of the signal distribution system of FIG. 1.

FIG. 2 is a block diagram of a front view of the wall outlet 180 of signal distribution system 100 of FIG. 1. FIG. 3 depicts a side perspective view of wall outlet 180 and a satellite adaptor 150 of signal distribution system 100. As illustrated in FIG. 2, wall outlet 180 comprises coaxial receptacle terminals 201 and 202, which are coupled to lines 132 and 122, respectively. Outlet 180 also comprises data terminal 203. As illustrated in FIG. 3, an outlet 180 is affixed to wall 210, and may be coupled to (or may incorporate) satellite adaptor 150, by plugging terminals 132 and 122, respectively, into terminals 201 and 202. Each satellite adaptor 150 may also contain IR input and output ports, for coupling to LED emitter 175 and IR target 177.

Referring once more to FIG. 2, telephone data terminal 203 of outlet 180 preferably carries a four-pair telephone data line which is coupled to other similar terminals of the other fifteen outlets in the house. The telephone data lines (not shown) are also applied as inputs to service center 110 and thence distributed to the plurality of wall outlets.

In a preferred embodiment, lines 132 and 122 coupled to terminals 201 and 202 of each outlet are RG6 coaxial cables compliant with the CEBus standard, and the telephone line coupled to terminal 203 of each outlet is a Category 5 4-pair cable. A special combined cable is run to each outlet, having all three of these cables combined with a common jacket. As will be appreciated, Category 5 is an industry standard for defining the level of transmission performance of which a cable or connector system is capable. Further information on the Category 5 standard and related standards may be found at the web sites of the principal standards bodies, the Electronic Industries Alliance (http://www.eia.org/) and Telecommunications Industry Association (http://www.tiaonline.org/). One principal standard in this regard is the joint standard "EIA/TIA 568A".

In an alternative embodiment, service center 110 may also contain a local area network (LAN) unit, which may be used to establish a LAN throughout the house by way of data terminals 203 of the wall outlets.

As explained above, for purposes of transmitting local IR signals to other locations of the system, a type 1 IR coupler device 174 and LED emitter 175 are coupled to "down" coax cable 122, by which it receives the combined IR signal; and a type 2 IR coupler device 176 and IR target 177 are coupled to the "up" coax cable 132 for each playback component such as TV 171. As used herein, the term "type 1 IR coupler" refers to an isolation coupler, such as coupler 174, for use with an LED emitter, and a "type 2 IR coupler" refers to an isolation coupler, such as coupler 176, to be used with an IR target.

Thus, a user in the location having TV 171 may wish to watch on TV 171 a movie being played on a second VCR at a location having an outlet other than outlet 180. A remote control device 178 compatible with the controlled equipment (e.g., the second VCR) is manipulated and its output IR signal is received by IR target 177. This is converted to the low-frequency pulsed AC signal (e.g., a series of square-wave pulses of magnitude such as 5 V or 12 V, which appears as a DC signal to higher-frequency RF equipment) representing the IR control signal, and transmitted down the UP line 132 to service center 110. Because these electrical IR signals are DC from the point of view of the RF compatible equipment, DC inserter/bypasser 126 and DC inserter/bypasser 123 route this DC signal around the diplexer/amplifier set of components of service center 110, as explained above. Because of the high bandwidth of coaxial cables 132, 122, and because the electrical IR signals are at a very different frequency than the DBS and CATV (RF) signals, they can carry the electrical IR signals in addition to the RF signals.

DC inserter/bypasser 126 thus receives from combiner/splitter 116 up to sixteen sets of electrical (local) IR signals. These are combined and transmitted via choke coil 128 to choke coil 125 of DC inserter/bypasser 123. Thus, these DC signals are blocked by capacitor 127 from reaching diplexer 115, which is used for combining A/V RF signals. The combined electrical IR control signal is applied to combiner/splitter 111 by the capacitor 124 of DC inserter/bypasser 123 which prevents these DC signals from being applied to diplexer 112. Thus, the combined IR control signal is sent "up" the DOWN line 132. It is received by the IR coupler 174 in each location, which again siphons off the DC IR component and uses it to drive the LED emitter 175, and to block this DC signal from being applied to equipment such as modulator 173 and VCR 172.

Figure 5:
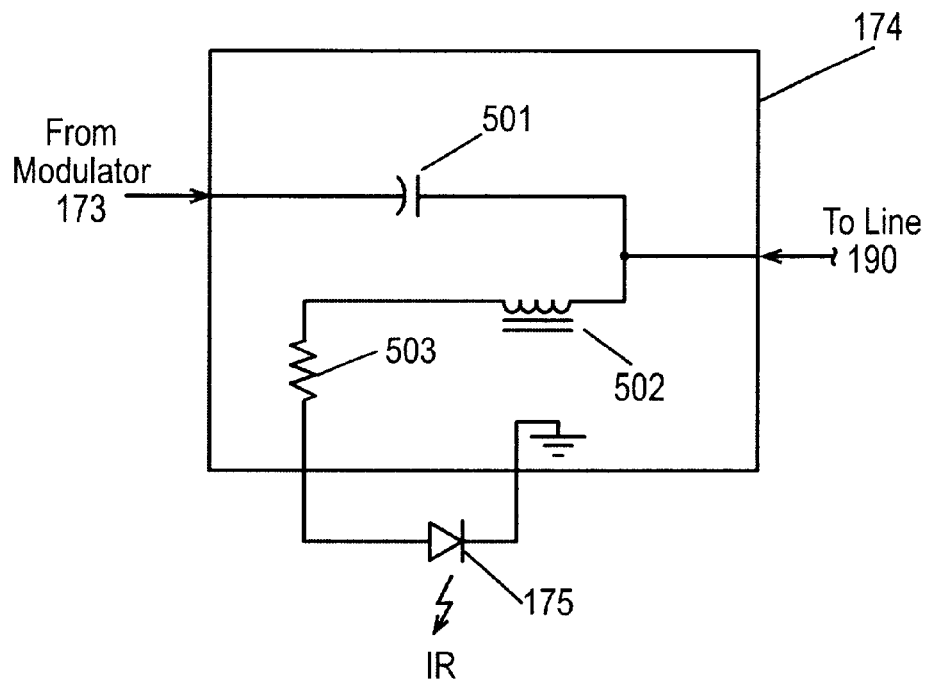
FIG. 5 illustrates the type 1 IR coupler and LED emitter of the signal distribution system of FIG. 1 in further detail.
Figure 6:
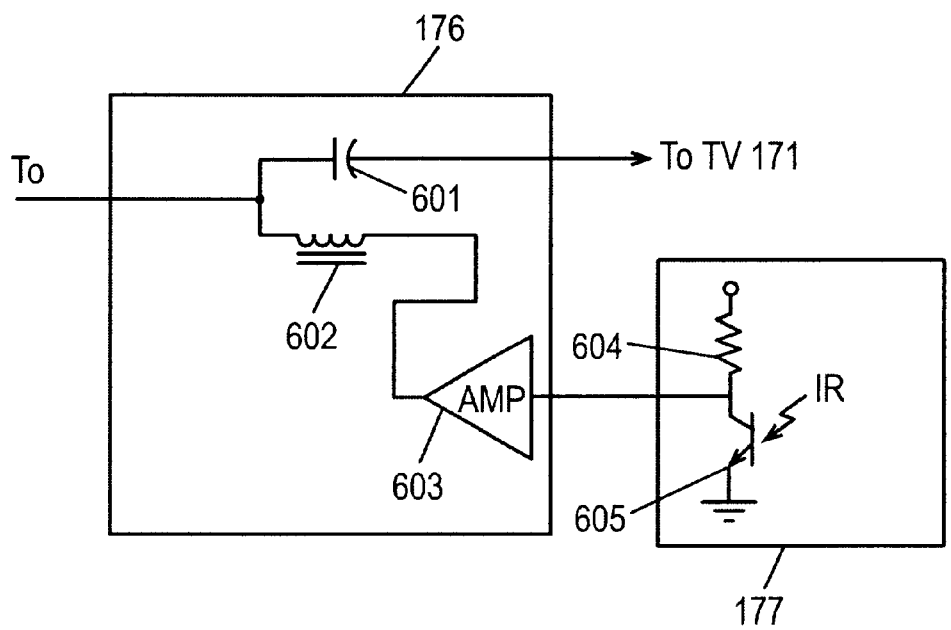
FIG. 6 illustrates the type 2 IR coupler and IR target of the signal distribution system of FIG. 1 in further detail.

Referring now to FIGS. 5 and 6, there are illustrated in further detail type 1 IR coupler 174 and LED emitter 175, and type 2 IR coupler 176 and IR target 177, respectively, of signal distribution system 100. Each IR coupler comprises an LC filter, as illustrated, to prevent a DC signal for the IR control signal from reaching sensitive RF equipment, so that the coaxial cables carry the DC IR signal to and from the service center without affecting sensitive components. Thus, type 1 IR coupler 174 comprises an LC filter (capacitor 501 and choke coil 502), and resistor 503, intercoupled as illustrated to drive IR LED 175. Type 2 IR coupler 176 comprises an LC filter (capacitor 601 and choke coil 602) and amp 603, which receives a signal from the resistor 604 and photosensitive transistor 605 pair of IR target 177.

In general, therefore, the present invention provides a system for distributing signals (e.g., A/V and IR signals) among a plurality of locations (e.g., rooms of a house) at a site (e.g., a house). The system has a plurality of wall outlets, one for each location (e.g., room), where each outlet is coupleable to an adaptor unit, such as satellite adaptor 150. The system has a distribution module (such as service center 110), which is coupled to each of the outlets by a plurality of first and second cable pairs, respectively, i.e. one first and second cable pair for each of the outlets. Each cable of a given first and second cable pair is sufficient to carry a (comparatively high-frequency) first-type signal, a (comparatively high-frequency) second-type signal, and a comparatively low-frequency electrical IR signals between an outlet and the distribution module. The first-type signal is, for example, a CATV type signal, and the second-type signal is a DBS signal (i.e., either a left-handed or right-handed polarized DBS signal). The first (up) cable carries a composite signal having a combined CATV signal and a left-handed polarized DBS signal from the distribution module to the outlet, and also carries the local IR signal down to the distribution module from a particular outlet. The second (down) cable carries local CATV (i.e., first-type) signal from the outlet to the distribution module, and also carries a right-handed polarized DBS signal and the combined IR signal from the distribution module to the outlet. (Alternatively, the first cable carries the right-handed polarized DBS signal and the second cable carries the left-handed polarized DBS signal, and/or the first cable carries the combined IR signal and the second cable carries the local IR signal.) The distribution module combines the local CATV signal (or local signals from several outlets) with a master CATV signal to provide the combined or composite CATV signal. The distribution module also combines all local electrical IR signals received from various first cables from various outlets having IR targets to provide the combined electrical IR signal for distribution to all outlets via the second cable. IR couplers and DC inserter/bypassers are employed to isolate sensitive high-frequency compatible components such as RF components in the distribution module and at the outlets from the potentially damaging DC electrical IR signals.

The present invention thus provides a system for distribution of telephone data, IR, CATV, and DBS signals, in which these signals are provided to a plurality of similar outlets throughout the home. In addition, the present invention provides for flexibility in receiving A/V data from a selected site to be distributed to the plurality of outlets. In particular, the present invention provides means for distributing two separate "flavors" of DBS signals (i.e., left-hand and right-hand), two "flavors" of TV (CATV signals and TV signals transmitted "down" from particular locations), and two "flavors" of IR signals (local IR signals transmitted down and a combined IR signal transmitted up) among a plurality of outlets, using only two coaxial cables, as described in further detail above.

In the present invention, the two DBS signals (i.e., left and right) are multiplexed onto two coaxial cables. Satellite adaptor 150 is then used to demultiplex these signals so that they may feed a standard satellite receiver as well as a standard TV. In many situations, this allows the complete distribution of both left and right DBS "feeds" to all outlets, using existing cabling, for example where the special common jacket cable is already run from the service center to various rooms. Further, in the present system, the number of satellite receivers in simultaneous use is limited only by the number of wall outlets, for example, sixteen.

In an alternative embodiment, system 100 does not include satellite adaptor module 150 for locations which do not also have a satellite receiver 170. In this embodiment, it is still possible to use one cable to carry the combined CATV signal "up" to each outlet (whether or not it has a satellite adaptor module 150) and to carry the local IR signal down from the outlet; and another cable to carry a locally-generated TV signal "down" from the outlet as well as to carry the combined IR signal to the outlet.

In yet another embodiment, system 100 carries only CATV signals and IR signals between outlets, but does not carry DBS signals. In this embodiment, no satellite adaptor modules are used. In this embodiment, one cable for each outlet carries the combined CATV signal "up" to each outlet and also carries the local IR signal down from the outlet; and the other cable for the outlet carries a locally-generated TV signal "down" from the outlet and also carries the combined IR signal up to the outlet. Thus, in a system employing dual coaxial cables run from a central service center to each outlet to transmit TV signals to and from each outlet, the coaxial cables may also be employed to distribute IR signals among the outlets, to allow users at one outlet to control devices at other outlets, while preventing the IR signals from adversely affecting equipment designed to transmit and receive high-frequency TV-type signals.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A system for distributing signals, comprising:
   (a) a plurality of outlets comprising at least a first outlet coupled to an IR target for providing a local comparatively low-frequency electrical IR signal in response to an IR signal received by the IR target, and comprising at least a second outlet coupled to an IR emitter;

(b) a plurality of cable pairs, one cable pair coupled to each outlet and comprising first and second cables, and (c) a distribution module coupled to each outlet by respective first and second cables of said plurality of cable pairs, wherein each of the first and second cables is sufficient to carry both comparatively high-frequency signals and comparatively low-frequency electrical IR signals between a respective outlet and the distribution module, the distribution module comprising means for combining all local electrical IR signals received from said outlets via respective first cables into a combined electrical IR signal and for transmitting said combined electrical IR signal to said IR emitter via said second cable.

2. The system of claim 1, wherein each outlet is located at one of a plurality of locations at a site.

3. The system of claim 2, wherein the site is a building and each outlet is a wall outlet in a room of the building.

4. The system of claim 2, wherein the distribution module comprises means for isolating components thereof coupled to comparatively high-frequency signal compatible equipment from the electrical IR signals.

5. The system of claim 1, wherein the first and second cables are RG6 coaxial cables and each respective first and second cable pair are combined with a common jacket to form a combined cable.

6. The system of claim 1, wherein the comparatively high-frequency signals comprise TV signals.

7. The system of claim 6, wherein:

each first cable carries a combined TV signal from the distribution module to the outlet to which the first cable is coupled and also carries any local IR signal from the outlet to the distribution module;

each second cable carries the combined electrical IR signal from the distribution module to the outlet and carries any local TV signal from the outlet to the distribution module; and the combined TV signal is provided by the distribution module by combining the local TV signal with a master TV signal.

8. The system of claim 7, wherein:

the local TV signal comprises at least one channel of audio/video (A/V) data and is generated by a local TV signal source coupled to the outlet; and the master TV signal comprises a plurality of channels of A/V data.

9. The system of claim 7, wherein the distribution module comprises means for isolating components thereof coupled to comparatively high-frequency signal compatible equipment from the electrical IR signals.

10. The system of claim 7, wherein the distribution module comprises:

a combiner and amplifier for combining all local TV signals with the master TV signal; and a first DC inserter/bypasser and a second DC inserter/bypasser coupled together for routing the combined electrical IR signal around the combiner and amplifier.

11. The system of claim 2, wherein the comparatively high-frequency signals further comprise one of a left-handed and right-handed polarized digital broadcast satellite (DBS) signal, and each of the first and second cables has a bandwidth sufficient to carry simultaneously a TV signal, one of a left-handed and right-handed polarized DBS signal, and an electrical IR signal.

12. The system of claim 11, wherein:

each first cable carries a combined TV signal and one of a left-handed and right-handed polarized signal from the distribution module to the outlet to which the first cable is coupled and also carries any local IR signal from the outlet to the distribution module;

each second cable carries the combined electrical IR signal and the other of the left-handed and right-handed polarized signal from the distribution module to the outlet and carries any local TV signal from the outlet to the distribution module; and the combined TV signal is provided by the distribution module by combining the local TV signal with a master TV signal.

13. The system of claim 12, wherein the distribution module comprises:

a first diplexer for receiving and combining the combined TV signal and the left-handed polarized signal;

a first combiner/splitter for receiving the combined TV signal and the left-handed polarized signal from the first diplexer and for splitting and providing said combined TV signal and the left-handed polarized signal to each said outlet via each respective first cable, wherein said first combiner/splitter is further for receiving and combining local electrical IR signals via said first cables to provide the combined electrical IR signal;

a first DC inserter/bypasser coupled between the first diplexer and the first combiner/splitter to isolate the first diplexer from said combined electrical IR signal;

a second diplexer for receiving the right-handed polarized signal from a polarized signal source and for receiving any local TV signals via respective second cables;

a second combiner/splitter for receiving and combining any local TV signals and for splitting and providing said combined IR signal and the right-handed polarized signal to each said outlet via each respective first cable;

a second DC inserter/bypasser coupled between the second diplexer and the second combiner/splitter and coupled to the first DC inserter/bypasser for receiving the combined IR signal and for isolating the second diplexer from said combined electrical IR signal; and a combiner for receiving the local TV signals from the second diplexer, for receiving the master TV signal from a master TV signal source, and for combining said signals to provide the combined TV signal to the first diplexer.

14. The system of claim 12, wherein each outlet is coupleable to an adaptor unit, the adaptor unit comprising:

(1) a first IR coupler for receiving the master IR signal via said second cable, for routing said master IR signal to an IR emitter at the outlet;

(2) a first diplexer coupled to the second cable via the first IR coupler, wherein the first diplexer is for receiving the local TV signal from a local TV signal source, for receiving the right-handed polarized signal from the distribution module via the second cable, for transmitting the local TV signal to the distribution module via the second cable, and for transmitting the right-handed polarized signal to a video switch, wherein the first IR coupler isolates the first diplexer from the master IR signal;

(3) a second IR coupler for receiving a local IR signal from an IR target at the outlet;

(4) a second diplexer coupled to the first cable via the second IR coupler, wherein the second diplexer is for receiving the combined first-type signal and the left-handed polarized signal from the distribution module via the first cable, for transmitting the combined first-type signal to a first out terminal of the adaptor unit, and for transmitting the left-handed polarized signal to the video switch, wherein the second IR coupler isolates the second diplexer from the local IR signal; and (5) the video switch for receiving the right-handed and left-handed polarized signals and for combining said polarized signals to provide an output signal to a second out terminal of the adaptor unit.

15. A method for distributing signals, comprising:

(a) coupling a distribution module to each of a plurality of outlets via respective first and second cables for each outlet, wherein each of the first and second cables is sufficient to sufficient to carry both comparatively high-frequency signals and comparatively low-frequency electrical IR signals between a respective outlet and the distribution module, wherein the plurality of outlets comprises at least a first outlet coupled to an IR target for providing a local comparatively low-frequency electrical IR signal in response to an IR signal received by the IR target, and at least a second outlet coupled to an IR emitter;

(b) transmitting a combined comparatively high-frequency signal from the distribution module to the outlet via the first cable and transmitting a local comparatively high-frequency signal from the outlet to the distribution module via the second cable;

(c) transmitting any local electrical IR signal from the outlet to the distribution module via one of the first and second cables and transmitting a combined electrical IR signal from the distribution module to the outlet via the other of the first and second cables;

(d) combining, with the distribution module, the local comparatively high-frequency signal with a master comparatively high-frequency signal to provide the combined comparatively high-frequency signal;

(e) combining, with the distribution module, all local electrical IR signals received from said outlets via respective first cables into a combined electrical IR signal and transmitting said combined electrical IR signal to said IR emitter via said second cable.

* * * * *